United States Patent
Chan et al.

(10) Patent No.: US 11,148,208 B2
(45) Date of Patent: Oct. 19, 2021

(54) VIBRATION ASSISTED DRILLING SYSTEM AND METHOD OF USE

(71) Applicant: The Boeing Company, Chicago, IL (US)

(72) Inventors: Kwok Tung Chan, Seattle, WA (US); Tobias Weber, Munich (DE)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 16/780,740

(22) Filed: Feb. 3, 2020

(65) Prior Publication Data

US 2021/0237172 A1    Aug. 5, 2021

(51) Int. Cl.
*B23B 29/12* (2006.01)
*B23Q 1/60* (2006.01)
*B23B 37/00* (2006.01)

(52) U.S. Cl.
CPC ............ *B23B 29/125* (2013.01); *B23Q 1/601* (2013.01); *B23B 37/00* (2013.01); *Y10T 408/23* (2015.01)

(58) Field of Classification Search
CPC ......... B23B 29/125; B23B 37/00; B23Q 1/60; B23Q 1/601; Y10T 408/23
See application file for complete search history.

(56) References Cited

U.S. PATENT DOCUMENTS

| | | | | |
|---|---|---|---|---|
| 2,073,518 A | * | 3/1937 | Hirvonen | B23Q 5/268 408/17 |
| 2,260,327 A | * | 10/1941 | McKee | B23B 41/00 173/6 |
| 2,515,851 A | * | 7/1950 | Bevins | B23Q 16/003 408/8 |
| 2,853,903 A | * | 9/1958 | Hauser | B23B 41/14 408/17 |
| 2,922,323 A | * | 1/1960 | Weidner | B23B 41/02 408/17 |
| 4,123,188 A | * | 10/1978 | Deremo | B23Q 5/06 408/17 |
| 4,350,212 A | * | 9/1982 | Hirose | B23Q 5/265 173/6 |
| 9,975,211 B2 | * | 5/2018 | Hariki | G05B 19/40937 |

(Continued)

FOREIGN PATENT DOCUMENTS

| | | |
|---|---|---|
| CN | 101412185 A | 4/2009 |
| CN | 104181006 A | 12/2014 |

(Continued)

OTHER PUBLICATIONS

"6D Drilling: Vibration-assisted drilling spindle with magnetic bearing for 6 degrees of freedom when drilling," LTI Motion, Korber Solutions, Sep. 2016, 4 pages.

(Continued)

*Primary Examiner* — Eric A. Gates
(74) *Attorney, Agent, or Firm* — Yee & Associates, P.C.

(57) ABSTRACT

A vibration assisted drilling system is presented. The vibration assisted drilling system comprises a drill feed motion system having a drill feed axis, an oscillation motion system having an oscillation axis, a drill spindle having a drill bit, and a mounting system configured to connect the drill spindle to the oscillation motion system. The drill feed axis is substantially parallel to and offset from the oscillation axis.

20 Claims, 8 Drawing Sheets

(56) References Cited

U.S. PATENT DOCUMENTS

2017/0297159 A1\* 10/2017 Sannomiya ........... B23B 29/125
2018/0257192 A1\* 9/2018 Nakaya .............. G05B 19/4093
2019/0054583 A1 2/2019 Dirscherl et al.

FOREIGN PATENT DOCUMENTS

| CN | 107378035 A | 11/2017 | |
| CN | 207388015 U | 5/2018 | |
| DE | 4419610 A1 \* | 12/1995 | ............... B23B 3/06 |
| EP | 3354403 A1 | 8/2018 | |
| JP | 2009214286 A | 9/2009 | |
| WO | WO-2015158318 A1 \* | 10/2015 | ........... B23B 29/125 |

OTHER PUBLICATIONS

European Patent Office Extended Search Report, dated Jul. 9, 2021 regarding EP Application No. 21153217.1, 7 pages.

\* cited by examiner

VIBRATION ASSISTED DRILLING SYSTEM AND METHOD OF USE

BACKGROUND INFORMATION

1. Field

The present disclosure relates generally to drilling and more specifically to a vibration assisted drilling (VAD).

2. Background

Drilling and fastening are steps taken in the assembly process for many different types of structures. Some structures are formed of more than one type of material. Drilling can be performed through mixed material stacks, such as a layer of metal and a layer of composite material. Drilling mixed material stacks can be undesirably time-consuming, limiting production flow and rate.

In conventional drilling processes, a drill bit is driven towards a workpiece as the drill bit is rotated. In conventional drilling, the drill bit is maintained in contact with the material of the workpiece. Conventional drilling processes can result in different sizes of debris. The debris can include long coiled debris. In some illustrative examples, the debris can become tangled around a drill bit. While tangled around the drill bit, the debris turns within the borehole, pulling material from the workpiece.

Conventional drilling creates friction, heating both the drill bit and the workpiece. In some illustrative examples, conventional drilling generates an undesirable amount of heat in the workpiece.

Therefore, it would be desirable to have a method and apparatus that takes into account at least some of the issues discussed above, as well as other possible issues.

SUMMARY

An example of the present disclosure provides a vibration assisted drilling system is presented. The vibration assisted drilling system comprises a drill feed motion system having a drill feed axis, an oscillation motion system having an oscillation axis, a drill spindle having a drill bit, and a mounting system configured to connect the drill spindle to the oscillation motion system. The drill feed axis is substantially parallel to and offset from the oscillation axis.

Another example of the present disclosure provides a vibration assisted drilling system. The vibration assisted drilling system comprises a drill feed motion system having a servo and a number of linear rails, an oscillation motion system having an actuator and an oscillation axis, and a drill spindle having a drill bit. The drill spindle is mounted to the oscillation motion system. The drill feed motion system has a drill feed axis and the oscillation axis is separated from the drill feed axis.

A method of performing vibration assisted drilling. A drill spindle is moved towards a material by a drill feed motion system having a drill feed axis. A drill bit of the drill spindle is rotated as the drill spindle is propelled towards the material. The drill spindle is oscillated towards and away from the material by an oscillation motion system, wherein the oscillation motion system has an oscillation axis substantially parallel to and offset from the drill feed axis, and wherein the oscillation motion system connects the drill spindle to the drill feed motion system.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. The illustrative examples recognize and take into account that drilling metals, may result in long chips. Large drilling debris, such as long spiral strips or large chips can result in scratching at the hole wall. The illustrative examples recognize and take into account that large debris may also result in at least one of creating additional friction and additional heat, damaging hole surface and increasing the roughness, changing hole diameter which will affect performance, or producing unreliable chip extraction.

The illustrative examples recognize and take into account that full retract pecking significantly increasing process times, limiting automation and rate capability. The illustrative examples recognize and take into account that conventional drilling processes can result in different sizes of debris. The debris can include long coiled debris. Conventional drilling can result in debris ranging in weight from about 20 mg to about 70 mg.

The illustrative examples recognize and take into account that vibration assisted drilling (VAD) is being investigated to control drilling debris size. The illustrative examples recognize and take into account that vibration assisted drilling (VAD), the drilling temperature is lower than conventional drilling.

The illustrative examples recognize and take into account that in some vibration assisted drilling devices, drill feed and oscillation motion are provided by one servo motor. In these illustrative examples, drill feed and oscillation motion are in the same axis. The oscillation frequency is limited by the servo motor response time. The illustrative examples recognize and take into account that in some vibration assisted drilling devices, oscillation is present within the drill spindle. The illustrative examples recognize and take into account that oscillation systems within a drill spindle are limited in size and type.

Figure 1:
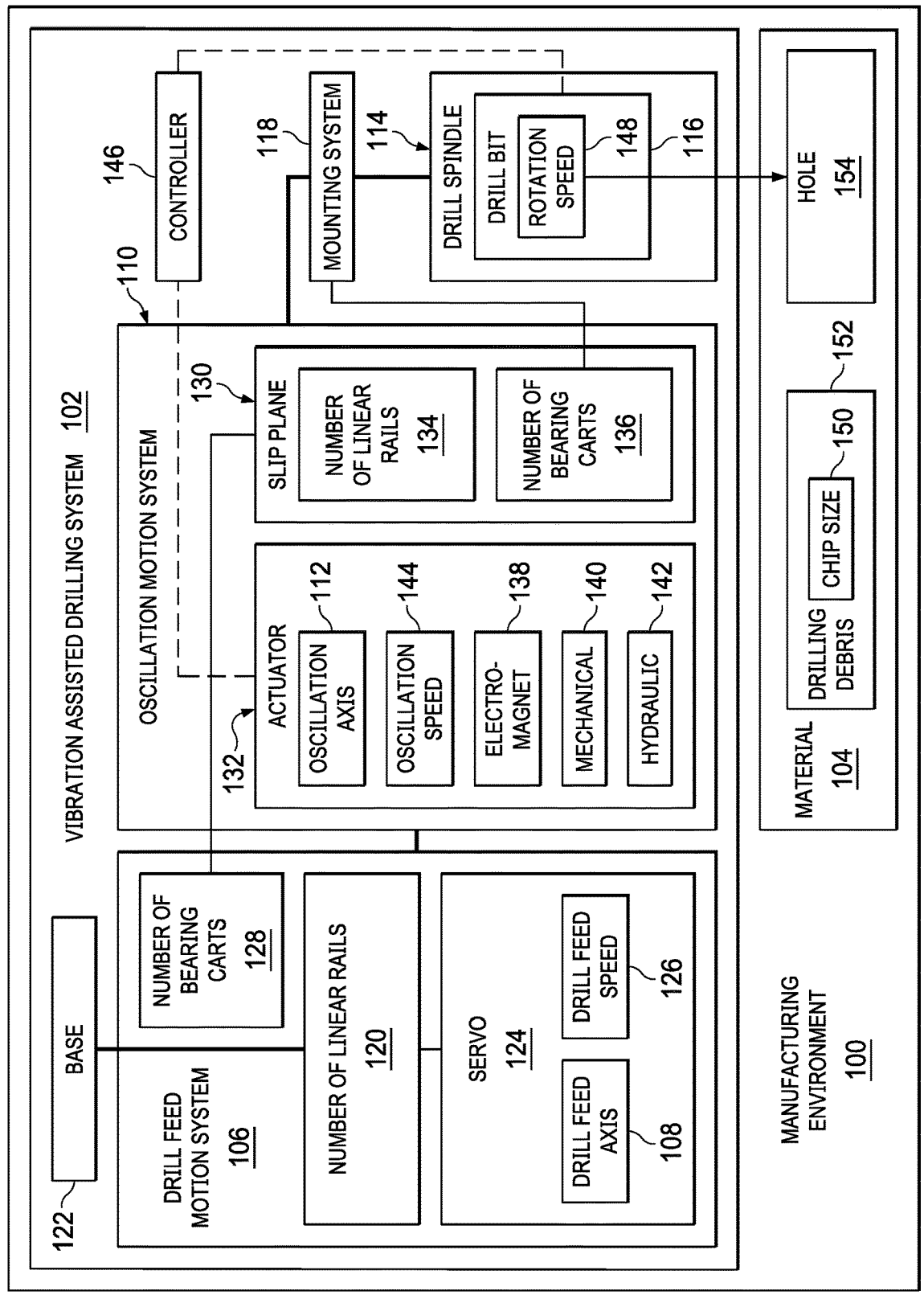
FIG. 1 is an illustration of a block diagram of a manufacturing environment in which an illustrative example may be implemented.

Turning now to FIG. 1, an illustration of a block diagram of a manufacturing environment in which an illustrative example may be implemented is depicted. Manufacturing environment 100 includes vibration assisted drilling system 102 configured to perform vibration assisted drilling (VAD) on material 104. Vibration assisted drilling system 102 comprises drill feed motion system 106 having a drill feed axis 108, oscillation motion system 110 having an oscillation axis 112, a drill spindle 114 having a drill bit 116, and a mounting system 118 configured to connect the drill spindle 114 to the oscillation motion system 110. Drill feed axis 108 is substantially parallel to and offset from oscillation axis 112.

In vibration assisted drilling system 102, feed oscillation is independent of main drill feed. Drill feed motion system 106 comprises number of linear rails 120 connected to base 122. Drill feed motion system 106 moves oscillation motion system 110 and drill spindle 114 along number of linear rails 120 to provide drill feed of drill bit 116. Servo 124 of drill feed motion system 106 provides movement of drill spindle 114 in a drill feed direction. Servo 124 controls drill feed speed 126 and moves number of bearing carts 128 along drill feed axis 108 on number of linear rails 120. Linear bearing carts, number of bearing carts 128, on rails, number of linear rails 120, are able to handle bending movement induced by drilling end effector including drill spindle 114.

Drill feed speed 126 is the speed at which drill bit 116 to directed towards material 104. Drill feed speed 126 is set based on desired operation. Drill feed speed 126 is limited by the capacity of servo 124. Servo 124 is a motor including control circuitry and a shaft.

Oscillation motion system 110 is connected to number of bearing carts 128 of drill feed motion system 106. Oscillation motion system 110 comprises slip plane 130 and actuator 132 with oscillation axis 112. Slip plane 130 is a mechanical system configured to allow movement in a single axis. In some illustrative examples, slip plane 130 comprises number of linear rails 134 and number of bearing carts 136. Linear bearing carts, number of bearing carts 136, on rails, number of linear rails 134, are able to handle bending movement induced by drilling end effector including drill spindle 114.

Actuator 132 moves number of bearing carts 136 along number of linear rails 134. Actuator 132 takes any desirable form. In some illustrative examples, actuator 132 is one of electro-magnetic 138, mechanical 140, or hydraulic 142. Actuator 132 provides oscillation speed 144 to number of bearing carts 136 and components connected to number of bearing carts 136. Actuator 132 is capable of oscillation speed 144 greater than a maximum value of drill feed speed 126 for drill feed motion system 106.

Specifications for oscillation motion system 110 are determined based on the technical specifications of drilling hole 154 in material 104. For example, desired specifications for oscillation motion system 110 can be affected by a type of material 104, a thickness of material 104, a size of hole 154, an order of layers in material 104, or other characteristics of the drilling process. In some illustrative examples, hole 154 has a diameter in the range of 0.25 inches to 0.875 inches. In some illustrative examples, oscillation amplitude of actuator 132 is in the range of 0.06 mm-0.20 mm. In some illustrative examples, oscillation amplitude of actuator 132 is in the range of 0.06 mm-0.16 mm. In some illustrative examples, oscillation frequency is desirably up to 100 Hz. In some illustrative examples, oscillation frequency is in the range of 25 Hz-80 Hz.

In vibration assisted drilling system 102, mounting system 118 mounts drill spindle 114 to number of bearing carts 136. Servo 124 drives number of bearing carts 128 towards material 104 to provide drill feed speed 126 to drill spindle 114. As drill feed motion system 106 provides movement of drill spindle 114 towards material 104, drill bit 116 is rotated.

As drill spindle 114 is driven towards material 104 by movement of number of bearing carts 128, drill spindle 114 is driven towards and away from material 104 in an oscillating or "pecking" motion by movement of number of bearing carts 136. Number of bearing carts 136 are driven in an oscillating fashion by actuator 132.

Providing drill feed motion of drill spindle 114 by drill feed motion system 106 and oscillation motion of drill spindle 114 by oscillation motion system 110 provides greater oscillation speeds. Controller 146 is configured to control at least one of servo 124, actuator 132, or a rotation actuator of drill bit 116. Controller 146 is configured to synchronize oscillation speed 144 of oscillation motion system 110 and rotation speed 148 of drill bit 116 of drill spindle 114. In some illustrative examples, rotation speed 148 is referred to as RPM (rotations per minute) provided by drill spindle 114. In some illustrative examples, drill spindle 114 RPM is up to 8000 RPM.

By synchronizing oscillation speed 144 and rotation speed 148, chip size 150 of drilling debris 152 generated by vibration assisted drilling system 102 is controlled. Vibration assisted drilling system 102 drills hole 154 and generates drilling debris 152 having chip size 150. Chip size 150 is configured to provide reliable extraction of drilling debris 152. In some illustrative examples, chip size 150 is less than drilling debris generated by conventional drilling operations. In some illustrative examples, chip size 150 is less than 5 mg in weight. In some illustrative examples, tolerance for chip size 150 is +/−1 mg.

Vibration assisted drilling system 102 comprises drill feed motion system 106 having servo 124 and number of linear rails 120; oscillation motion system 110 having actuator 132 and oscillation axis 112; and drill spindle 114 having drill bit 116, drill spindle 114 mounted to oscillation motion system 110. Drill feed motion system 106 has drill feed axis 108, and oscillation axis 112 is separated from drill feed axis 108. In vibration assisted drilling system 102 oscillation motion system 110 further comprises slip plane 130.

In some illustrative examples, drill thrust load supplied by vibration assisted drilling system 102 is up to 500 pounds. The drill thrust load limit is affected by an automation platform connected to assisted drilling system 102.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example. For example, slip plane 130 can take the form of another type of mechanical movement system other than number of linear rails 134 and number of bearing carts 136.

As another illustrative example, sensors associated with drill spindle 114, oscillation motion system 110, and drill feed motion system 106 are not depicted, but can be present for process monitoring and process control.

Figure 2:
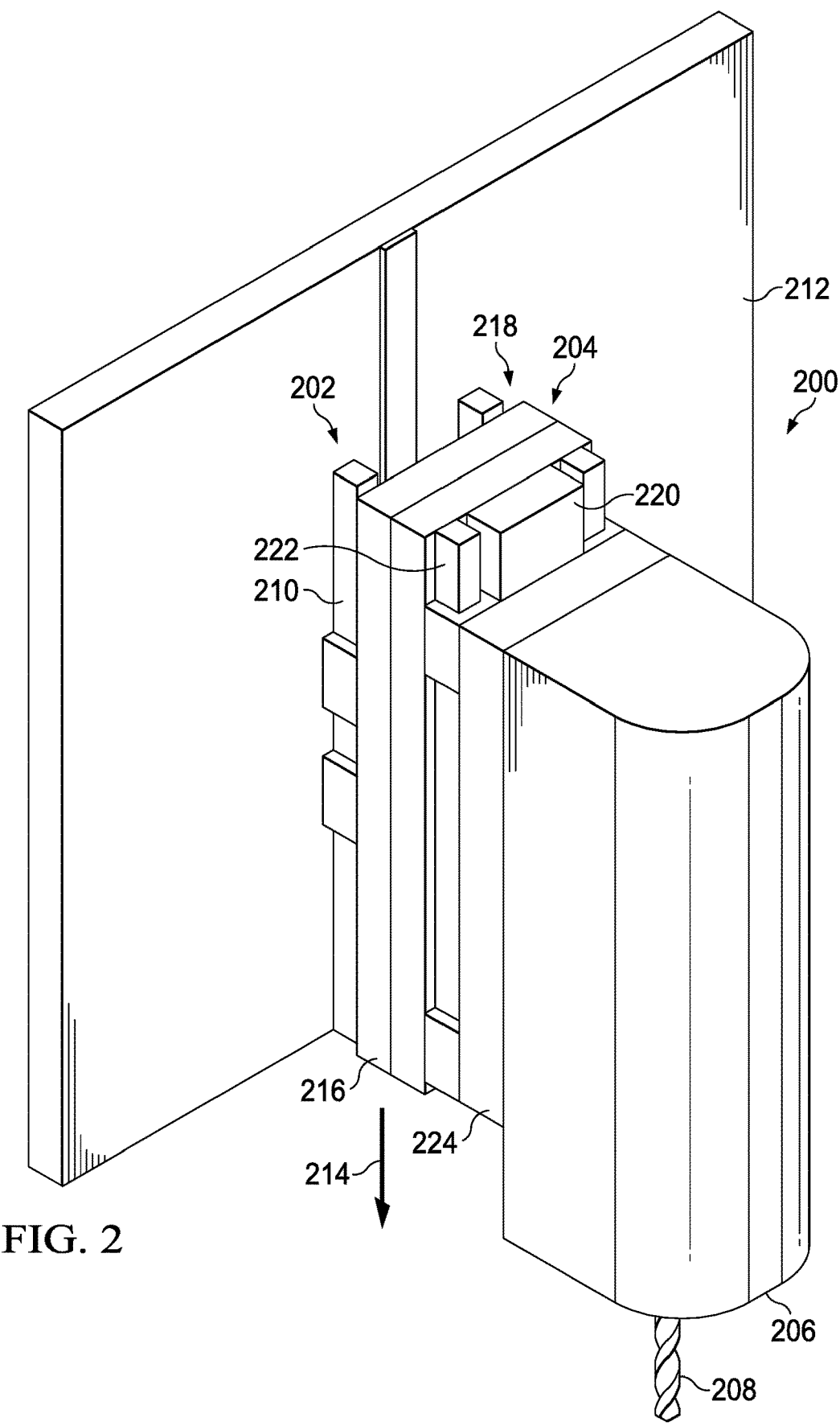
FIG. 2 is an illustration of a perspective view of a vibration assisted drilling system in accordance with an illustrative example.

Turning now to FIG. 2, an illustration of a perspective view of a vibration assisted drilling system is depicted in accordance with an illustrative example. Vibration assisted drilling system 200 is a physical implementation of vibration assisted drilling system 102 of FIG. 1.

Vibration assisted drilling system 200 comprises drill feed motion system 202, oscillation motion system 204, and drill spindle 206 having drill bit 208, and a mounting system (not depicted) configured to connect drill spindle 206 to oscillation motion system 204.

In vibration assisted drilling system 200, feed oscillation is independent of main drill feed. Drill feed motion system 202 comprises number of linear rails 210 connected to base 212. Drill feed motion system 202 moves oscillation motion system 204 and drill spindle 206 along number of linear rails 210 to provide drill feed of drill bit 208. Servo (not depicted) of drill feed motion system 202 provides movement of drill spindle 206 in drill feed direction 214. The servo controls drill feed speed and moves number of bearing carts 216 along number of linear rails 210.

Oscillation motion system 204 is connected to number of bearing carts 216 of drill feed motion system 202. Oscillation motion system 204 comprises slip plane 218 and actuator 220. Slip plane 218 is a mechanical system configured to allow movement in a single axis. In some illustrative examples, slip plane 218 comprises number of linear rails 222 and number of bearing carts 224.

Figure 3:
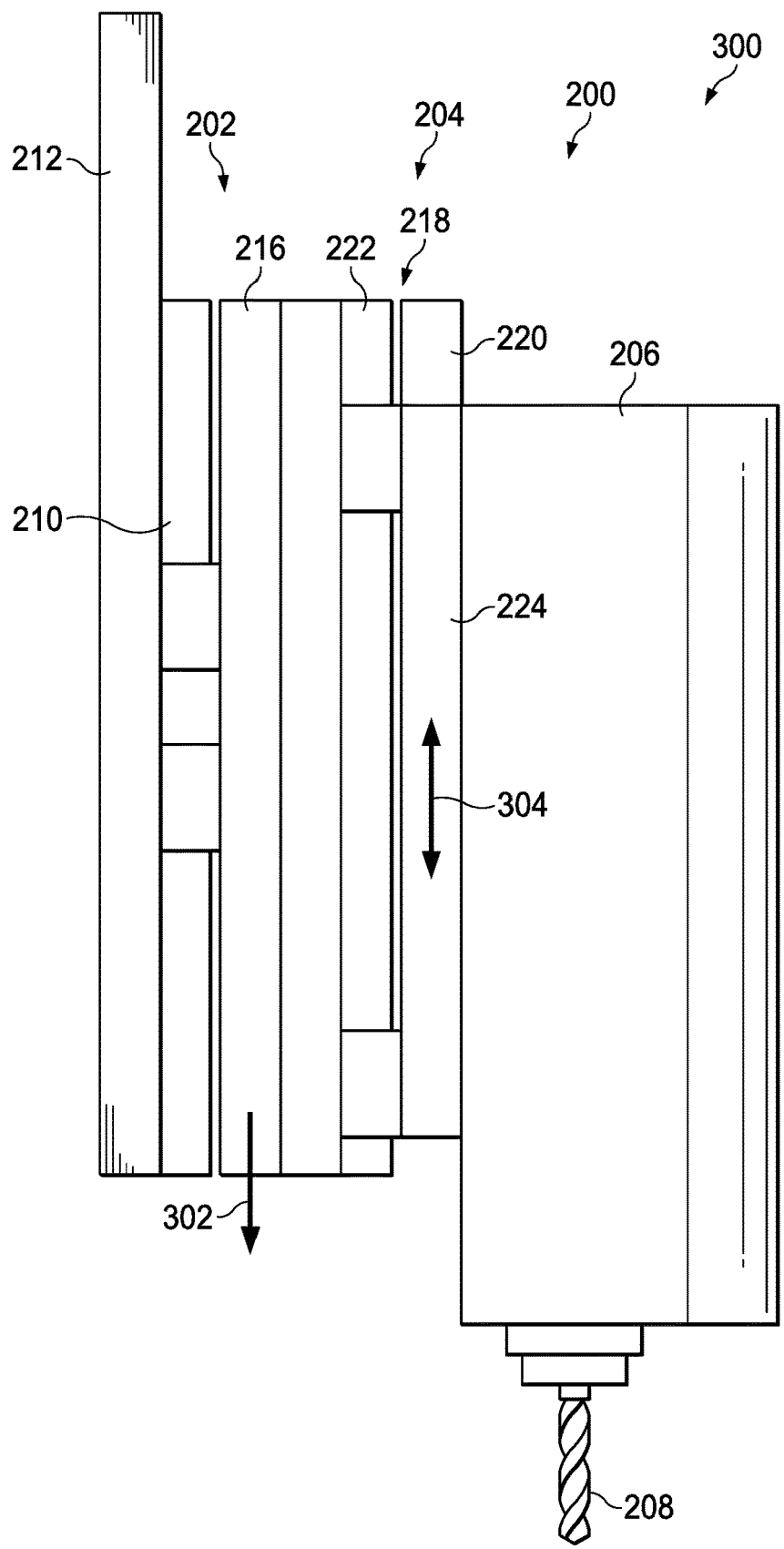
FIG. 3 is an illustration of a side view of a vibration assisted drilling system in accordance with an illustrative example.

Turning now to FIG. 3, an illustration of a side view of a vibration assisted drilling system is depicted in accordance with an illustrative example. View 300 is a side view of vibration assisted drilling system 200 of FIG. 2.

In view 300 of vibration assisted drilling system 200, drill feed axis 302 and oscillation axis 304 are indicated. Drill feed motion system 202 has drill feed axis 302. Drill feed axis 302 is the axis along which number of bearing carts 216 move. Oscillation motion system 204 has oscillation axis 304. Drill feed axis 302 is substantially parallel to and offset from oscillation axis 304.

Figure 4:
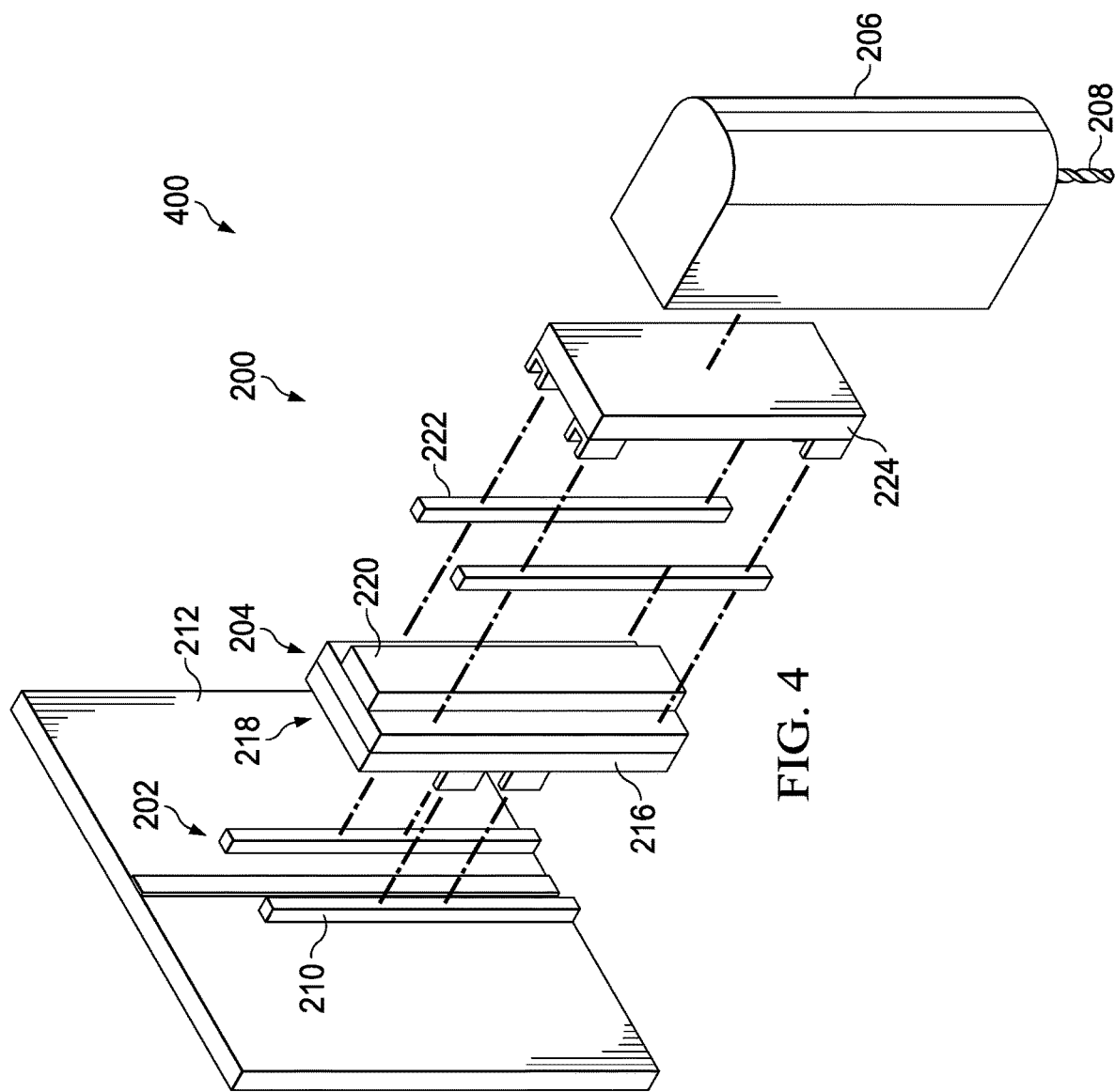
FIG. 4 is an illustration of an exploded view of a vibration assisted drilling system in accordance with an illustrative example.

Turning now to FIG. 4, an illustration of an exploded view of a vibration assisted drilling system is depicted in accordance with an illustrative example. View 400 is an exploded view of vibration assisted drilling system 200 of FIG. 2. In view 400, a servo of drill feed motion system 202 is not depicted. In some illustrative examples, a servo motor (not depicted) couples with a drive attached to linear rails 210.

The illustration of vibration assisted drilling system 200 of FIGS. 2-4 is not meant to imply physical or architectural limitations to the manner in which an illustrative example may be implemented. Other components in addition to or in place of the ones illustrated may be used. For example, in view 400, actuator 220, number of linear rails 222, and number of bearing carts 224 are part of a linear motor. In view 400, actuator 220 takes the form of a magnetic plate of a linear motor system. In this illustrative example, actuator 220 is electro-magnetic. Actuator 220 takes any desirable form. In other non-depicted examples, actuator 220 is one of mechanical or hydraulic. In some non-depicted illustrative examples, actuator 220 includes a servo and a ball screw drive assembly connected to number of bearing carts 224 of oscillation motion system 204. Additionally, vibration assisted drilling system 200 is not to scale.

Figure 5:
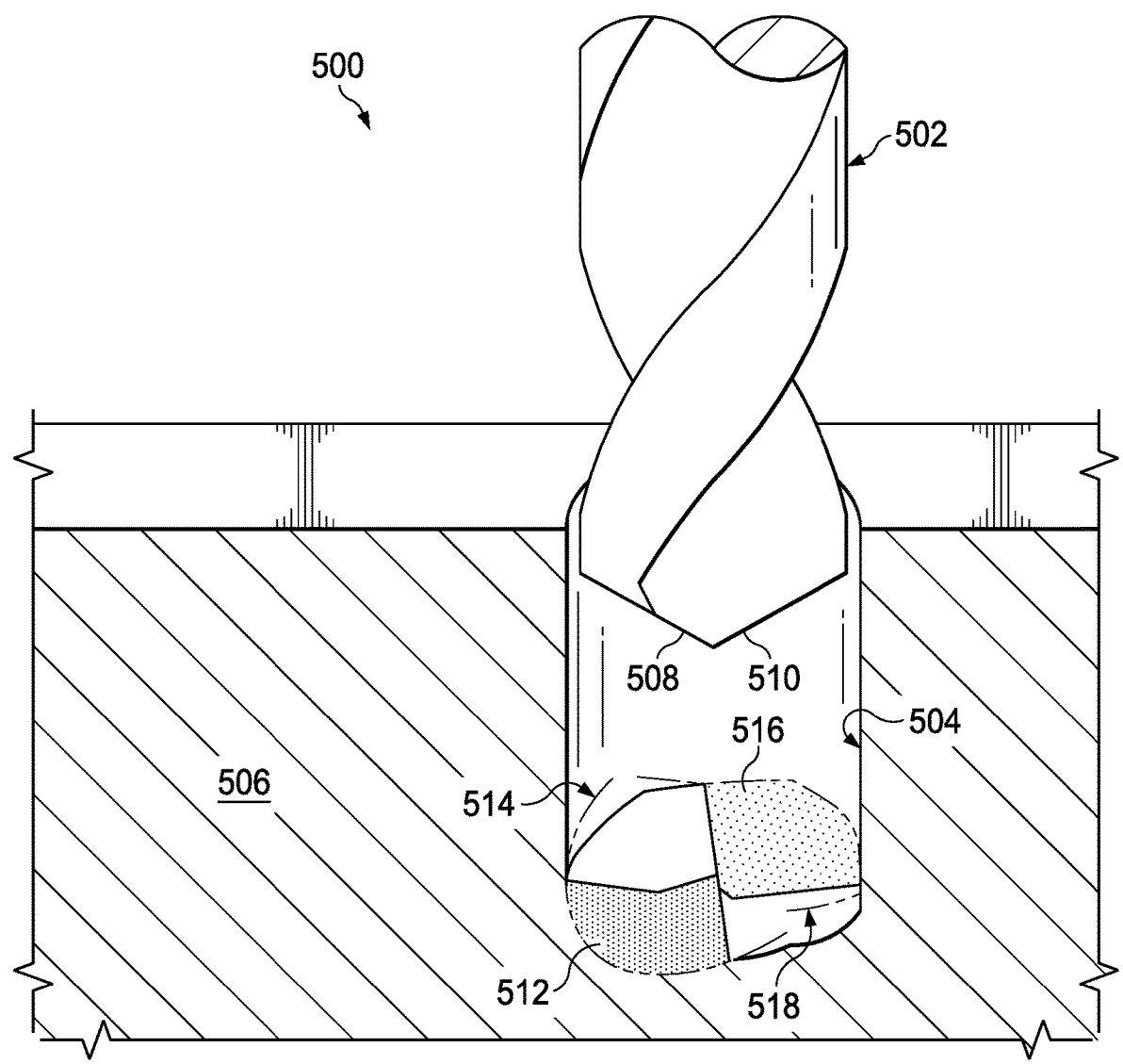
FIG. 5 is an illustration of a cross-sectional view of a drill bit of a vibration assisted drilling system in a hole in accordance with an illustrative example.

Turning now to FIG. 5, an illustration of a cross-sectional view of a drill bit of a vibration assisted drilling system in a hole is depicted in accordance with an illustrative example. View 500 is a cross-sectional view of drill bit 502 within hole 504 of material 506. Drill bit 502 can be a physical implementation of drill bit 116 of FIG. 1. In some illustrative examples, drill bit 502 is the same as drill bit 208 of FIGS. 2-4.

Figure 6:
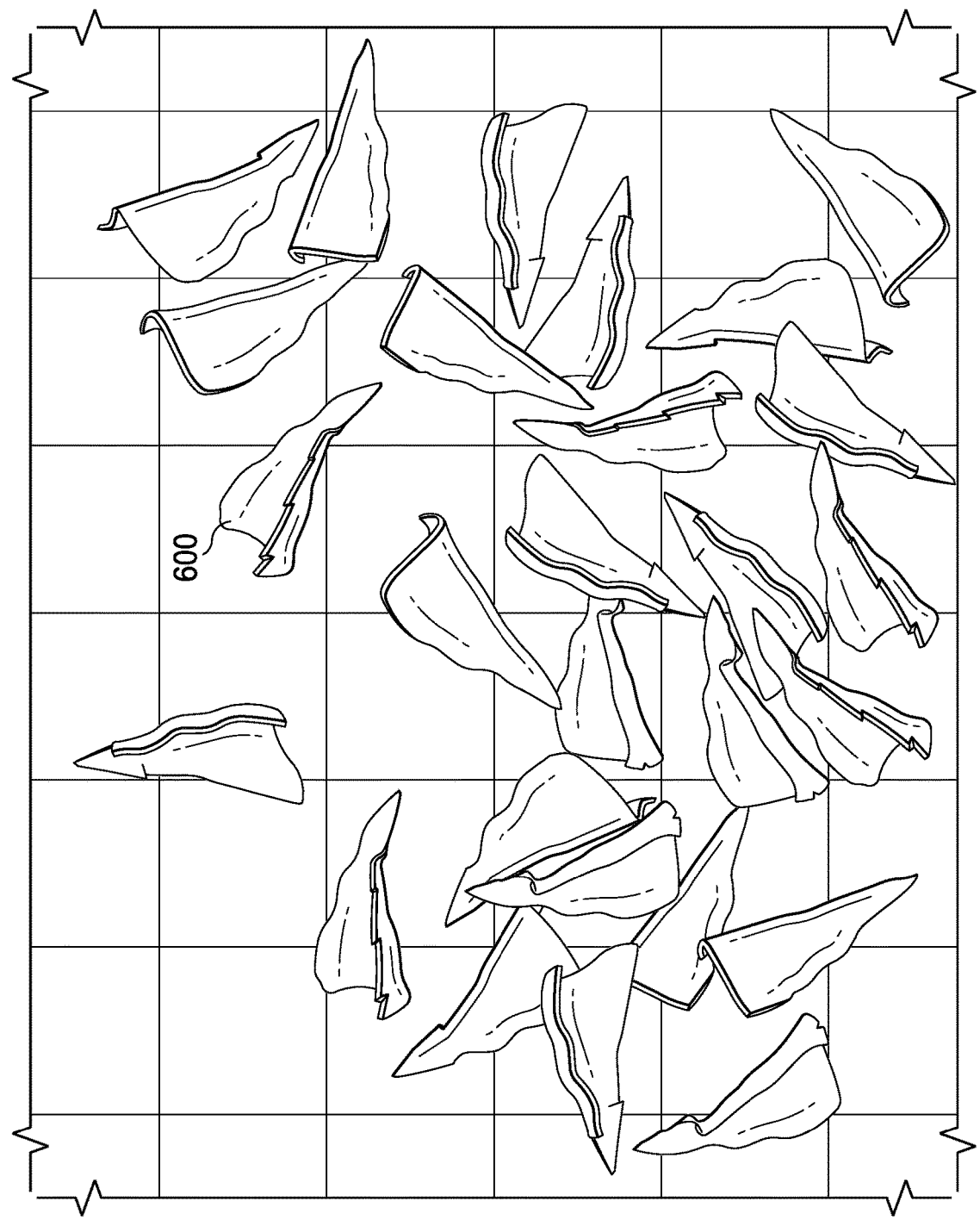
FIG. 6 is an illustration of a perspective view of drilling debris in accordance with an illustrative example.

As drill bit 502 rotates, blade 508 and blade 510 remove drilling debris, such as drilling debris 600 of FIG. 6, from material 506. Each of blade 508 and blade 510 will remove a respective chip. Portion 512 will be removed by one of blade 508 or blade 510 following cut path 514. Portion 516 will be removed by the other of blade 508 or blade 510 following cut path 518.

Turning now to FIG. 6, an illustration of a perspective view of drilling debris is depicted in accordance with an illustrative example. In some illustrative examples, drilling debris 600 is a physical implementation of drilling debris 152 of FIG. 1. In some illustrative examples, drilling debris 600 is generated by vibration assisted drilling system 200 of FIGS. 2-4. In some illustrative examples, drilling debris 600 is generated by drilling material 506 using drill bit 502 of FIG. 5.

Each chip of drilling debris 600 has a substantially same size and shape. The size and shape of chips of drilling debris 600 is controlled by synchronization of the oscillation speed and rotation speed of a drill bit. Each chip of drilling debris 600 has a weight of approximately 3 mg.

Producing drilling debris 600 of substantially the same size and shape and below 5 mg in weight improves hole quality by fast and reliable chip extraction. Producing drilling debris 600 reduces or prevents chips in interface.

The different components shown in FIGS. 2-6 may be combined with components in FIG. 1, used with components in FIG. 1, or a combination of the two. Additionally, some of the components in FIGS. 2-6 may be illustrative examples of how components shown in block form in FIG. 1 can be implemented as physical structures.

Figure 7:
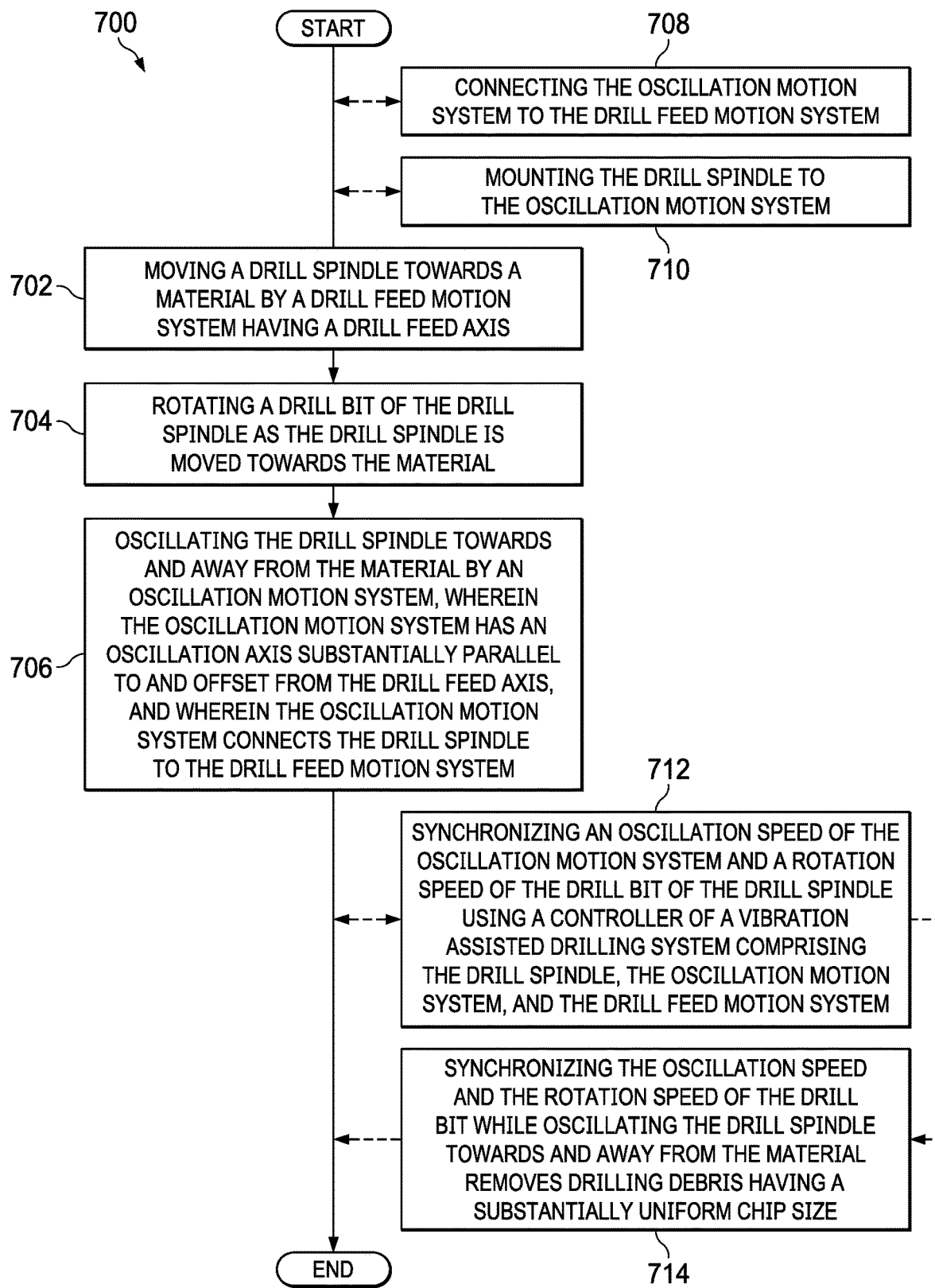
FIG. 7 is an illustration of a flowchart of a method of performing vibration assisted drilling in accordance with an illustrative example.

Turning now to FIG. 7, an illustration of a flowchart of a method of performing vibration assisted drilling is depicted in accordance with an illustrative example. Method 700 can be performed in manufacturing environment 100 using vibration assisted drilling system 102. Method 700 can be performed using vibration assisted drilling system 200 of FIGS. 2-6. Method 700 can be performed to produce drilling debris 600 of FIG. 6.

Method 700 moves a drill spindle towards a material by a drill feed motion system having a drill feed axis (operation 702). Method 700 rotates a drill bit of the drill spindle as the drill spindle is propelled towards the material (operation 704). Method 700 oscillates the drill spindle towards and away from the material by an oscillation motion system, wherein the oscillation motion system has an oscillation axis substantially parallel to and offset from the drill feed axis, and wherein the oscillation motion system connects the drill spindle to the drill feed motion system (operation 706). Afterwards, method 700 terminates.

In some illustrative examples, method 700 synchronizes an oscillation speed of the oscillation motion system and a rotation speed of the drill bit of the drill spindle using a controller of a vibration assisted drilling system comprising the drill spindle, the oscillation motion system, and the drill feed motion system (operation 712).

In some illustrative examples, synchronizing the oscillation speed and the rotation speed of the drill bit while oscillating the drill spindle towards and away from the material removes drilling debris having a substantially uniform chip size (operation 714). The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. In some illustrative examples, the substantially uniform chip size is within a tolerance of +/−1 mg In some illustrative examples, 700 connects the oscillation motion system to the drill feed motion system (operation 708) and mounts the drill spindle to the oscillation motion system (operation 710).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operations 708 and 710 may be optional.

Figure 8:
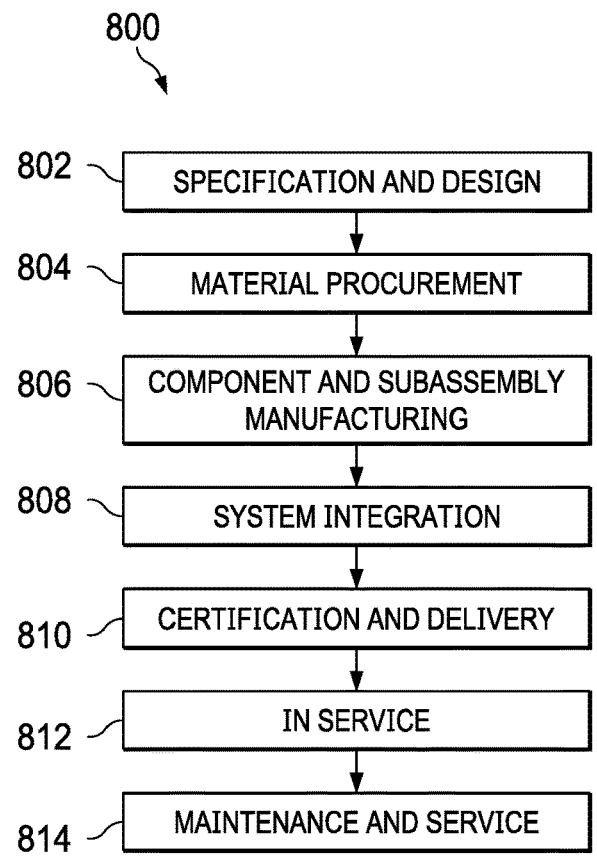
FIG. 8 is an illustration of an aircraft manufacturing and service method in a form of a block diagram in accordance with an illustrative example.
Figure 9:
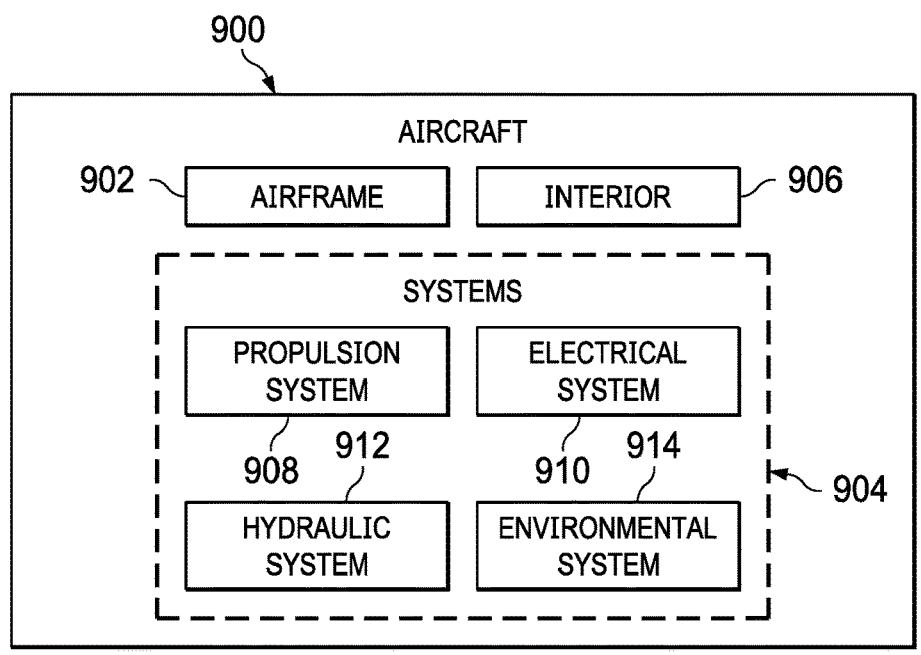
FIG. 9 is an illustration of an aircraft in a form of a block diagram in which an illustrative example may be implemented.

Illustrative examples of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative example. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812.

While in service 812 by a customer, aircraft 900 is scheduled for routine maintenance and service 814, which may include modification, reconfiguration, refurbishment, or other maintenance and service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative example may be implemented. In this example, aircraft 900 is produced by aircraft manufacturing and service method 800 of FIG. 8 and may include airframe 902 with plurality of systems 904 and interior 906. Examples of systems 904 include one or more of propulsion system 908, electrical system 910, hydraulic system 912, and environmental system 914. Any number of other systems may be included.

Apparatuses and methods embodied herein may be employed during at least one of the stages of aircraft manufacturing and service method 800. One or more illustrative examples may be manufactured or used during at least one of component and subassembly manufacturing 806, system integration 808, in service 812, or maintenance and service 814 of FIG. 8. Aircraft 900 can include structures assembled using vibration assisted drilling system 102 of FIG. 1. Vibration assisted drilling system 102 of FIG. 1 can be used during component and subassembly manufacturing 806. As an example, method 800 can be used during component and subassembly manufacturing 806 to drill holes to assemble a structure. In some illustrative examples, the structure drilled using vibration assisted drilling system 102 of FIG. 1 is a component of aircraft 900.

The illustrative examples present a vibration assisted drilling system having a drill feed axis and an oscillation axis parallel to and offset from the oscillation axis. The vibration assisted drilling system of the illustrative examples provides an external oscillation feed drive for timing base chip fragmentation through micro pecking. In the illustrative examples, feed oscillation is independent of main drill feed in the vibration assisted drilling system.

The drill feed and oscillation motion are independently powered by introducing a sliding/oscillation table or slip plane between the servo and the drill spindle. By separating the drill feed actuator and the oscillation actuator, oscillation frequency can be much higher powered. The oscillation can be controlled by a different type of actuator than the drill feed servo. By separating the drill feed actuator and the oscillation actuator, the oscillation is not constrained by servo motor response.

The implementation of vibration assisted drilling (VAD) with synchronized oscillation speed and drill bit rotation speed can decrease process time, thus increasing production rates. Vibration assisted drilling (VAD) with synchronized oscillation speed and drill bit rotation speed can improve hole quality by fast and reliable chip extraction. The illustrative examples can also reduce thrust and torque load. The smaller chips created by the illustrative examples produce less friction during drilling. The consistent chip fragmentation provided by the vibration assisted drilling (VAD) with synchronized oscillation speed and drill bit rotation speed reduces process load (thrust & torque load). With reduced thrust load, less adjacent clamping force can be used in the assembly stack. Thus, the illustrative examples can reduce at least one of torque load or clamping force.

Vibration assisted drilling (VAD) with synchronized oscillation speed and drill bit rotation speed improves surface roughness. Vibration assisted drilling (VAD) with synchronized oscillation speed and drill bit rotation speed improves fatigue life of drill bits. Synchronizing the oscillation speed and drill bit rotation speed using a controller provides monitoring of tool wear and process loads.

The vibration assisted drilling system with separate oscillation motion system enables the use of off shelf drilling spindle for end effector integration. Using an off the shelf drilling spindle reduces the costs of the vibration assisted drilling system. In some illustrative examples at least one of the feed drive or the oscillation source is also of the shelf.

When the oscillation motion system is separated from feed drive axis, the oscillation/sin wave motion is running independently of main feed drive motions. Therefore, the oscillation max frequency is no longer constrained by how fast the main feed drive (such as using servo motor) can react/respond, allowing higher max frequency for vibration assist drilling process and reducing drill cycle time.

By providing the oscillation motion system as an external system from the drill spindle, the oscillation actuator sizing and types have more options than internal actuators to the drill spindle. Linear bearing cart on rails is an effective way to handle bending movement induced by a drilling end effector.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A vibration assisted drilling system comprising:
   a drill feed motion system having a drill feed axis;
   an oscillation motion system having an oscillation axis, wherein the drill feed axis is substantially parallel to and offset from the oscillation axis; and
   a drill spindle coupled to the oscillation motion system, the drill spindle having a drill bit.

2. The vibration assisted drilling system of claim 1 further comprising:
   a controller configured to synchronize an oscillation speed of the oscillation motion system and a rotation speed of the drill bit of the drill spindle.

3. The vibration assisted drilling system of claim 1, wherein the oscillation motion system comprises a slip plane and an actuator with the oscillation axis.

4. The vibration assisted drilling system of claim 3, wherein the slip plane comprises a number of linear rails and a number of bearing carts.

5. The vibration assisted drilling system of claim 4, wherein the drill spindle is mounted to the number of bearing carts.

6. The vibration assisted drilling system of claim 3, wherein the actuator is one of electro-magnetic, mechanical, or hydraulic.

7. The vibration assisted drilling system of claim 3, wherein the actuator is capable of an oscillation speed greater than a maximum value of a drill feed speed for the drill feed motion system.

8. The vibration assisted drilling system of claim 1 wherein the drill feed motion system comprises a number of bearing carts and a number of linear rails, and wherein the drill spindle is connected to the number of bearing carts.

9. A vibration assisted drilling system comprising:
   a drill feed motion system, wherein the drill feed motion system has a drill feed axis;
   an oscillation motion system having an oscillation axis, wherein the oscillation axis is separated from the drill feed axis; and
   a drill spindle having a drill bit, the drill spindle mounted to the oscillation motion system.

10. The vibration assisted drilling system of claim 9 wherein the oscillation motion system further comprises an actuator and a slip plane,
    wherein the drill feed motion system comprises a servo and a number of linear rails.

11. The vibration assisted drilling system of claim 10, wherein the slip plane comprises a number of bearing carts and the drill spindle is connected to the number of bearing carts.

12. The vibration assisted drilling system of claim 10, wherein the actuator is one of electro-magnetic, mechanical, or hydraulic.

13. The vibration assisted drilling system of claim 10, wherein the actuator is capable of an oscillation speed greater than a maximum value of a drill feed speed for the drill feed motion system.

14. The vibration assisted drilling system of claim 9 further comprising:
    a controller configured to synchronize an oscillation speed of the oscillation motion system and a rotation speed of the drill bit of the drill spindle.

15. A method of performing vibration assisted drilling comprising:
    moving a drill spindle towards a material by a drill feed motion system having a drill feed axis;
    rotating a drill bit of the drill spindle as the drill spindle is propelled towards the material; and
    oscillating the drill spindle towards and away from the material by an oscillation motion system, wherein the oscillation motion system has an oscillation axis substantially parallel to and offset from the drill feed axis, and wherein the oscillation motion system connects the drill spindle to the drill feed motion system.

16. The method of claim 15 further comprising:
    synchronizing an oscillation speed of the oscillation motion system and a rotation speed of the drill bit of the drill spindle using a controller of a vibration assisted drilling system comprising the drill spindle, the oscillation motion system, and the drill feed motion system.

17. The method of claim 16 wherein synchronizing the oscillation speed and the rotation speed of the drill bit while oscillating the drill spindle towards and away from the material removes drilling debris having a substantially uniform chip size.

18. The method of claim 15 further comprising:
    connecting the oscillation motion system to the drill feed motion system; and
    mounting the drill spindle to the oscillation motion system.

19. The method of claim 15, wherein the oscillation motion system comprises an actuator capable of an oscillation speed greater than a maximum value of a drill feed speed for the drill feed motion system.

20. The method of claim 19, wherein the actuator is one of electro-magnetic, mechanical, or hydraulic.

* * * * *